United States Patent
Bhanage et al.

(10) Patent No.: US 10,638,424 B2
(45) Date of Patent: *Apr. 28, 2020

(54) AUTOMATIC DELIVERY TRAFFIC INDICATION MESSAGE INTERVAL CONTROL FOR BETTER MOBILE POWER SAVE PERFORMANCE

(71) Applicant: HEWLETT PACKARD ENTERPRISE DEVELOPMENT LP, Houston, TX (US)

(72) Inventors: Gautam Bhanage, Sunnyvale, CA (US); Partha Narasimhan, Saratoga, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,336

(22) Filed: Jul. 9, 2018

(65) Prior Publication Data

US 2018/0324699 A1 Nov. 8, 2018

Related U.S. Application Data

(63) Continuation of application No. 15/140,994, filed on Apr. 28, 2016, now Pat. No. 10,021,645, which is a (Continued)

(51) Int. Cl.
*H04W 52/02* (2009.01)

(52) U.S. Cl.
CPC ... *H04W 52/0229* (2013.01); *H04W 52/0216* (2013.01); *Y02D 70/00* (2018.01); *Y02D 70/142* (2018.01)

(58) Field of Classification Search
CPC ......... H04W 52/0216; H04W 52/0229; H04W 52/02; Y02D 70/142; Y02D 70/00
(Continued)

(56) References Cited

U.S. PATENT DOCUMENTS 7,295,827 B2 * 11/2007 Liu ....................... G06F 1/3209
455/343.2
7,355,998 B2 * 4/2008 Briancon .............. H04W 16/28
370/328

(Continued)

*Primary Examiner* — Man U Phan
(74) *Attorney, Agent, or Firm* — Nolte Intellectual Property Law Group (57) ABSTRACT

The present disclosure discloses a method and network device for automatic delivery traffic indication message (DTIM) interval control for better mobile power save performance. The disclosed network device determines one or more characteristics for at least one client device connected to an Access Point (AP). The network device then dynamically selects a DTIM interval for the AP based on the characteristics for the at least one client device, and configures the AP to transmit a DTIM beacon frame at a frequency based on the dynamically selected DTIM interval. Alternatively, the network device can determine one or more characteristics for a client device, and dynamically select a Virtual Access Point (VAP) for providing network access to the client device based on the characteristics for the client device and a DTIM interval configured for the VAP, and then cause the client device to connect to the VAP.

18 Claims, 5 Drawing Sheets

Related U.S. Application Data continuation of application No. 14/169,896, filed on Jan. 31, 2014, now Pat. No. 9,332,497.

(58) Field of Classification Search
USPC .......................................................... 370/311
See application file for complete search history.

(56) References Cited

U.S. PATENT DOCUMENTS

| | | | | |
|---|---|---|---|---|
| 7,433,669 | B2* | 10/2008 | Rue | H04L 12/12 455/343.2 |
| 7,885,217 | B2* | 2/2011 | Iyer | H04L 12/189 370/311 |
| 8,184,564 | B2* | 5/2012 | Kinder | H04L 41/00 370/310 |
| 8,335,937 | B2* | 12/2012 | Qi | G06F 1/3209 713/320 |
| 8,379,556 | B2* | 2/2013 | Choi | H04W 52/0251 370/311 |
| 2008/0049703 | A1* | 2/2008 | Kneckt | H04W 68/00 370/342 |
| 2011/0292925 | A1* | 12/2011 | Ho | H04W 88/08 370/338 |
| 2014/0146734 | A1* | 5/2014 | Katabathuni | H04W 52/0219 370/312 |
| 2014/0314054 | A1* | 10/2014 | Seok | H04W 8/26 370/336 |
| 2015/0043409 | A1* | 2/2015 | Choi | H04W 52/0216 370/311 |

\* cited by examiner

FIG. 5 ed upon the visibility at the entrance of the room. Such power management is important for maintaining performance of the wireless network for client devices, and at the same time assuring that the client devices have good power save performance.

AUTOMATIC DELIVERY TRAFFIC INDICATION MESSAGE INTERVAL CONTROL FOR BETTER MOBILE POWER SAVE PERFORMANCE

CROSS-REFERENCE TO RELATED APPLICATIONS

This application is a continuation of U.S. application Ser. No. 15/140,994 filed on Apr. 28, 2016, now U.S. Pat. No. 10,021,645, which was a continuation of U.S. application Ser. No. 14/169,896, now U.S. Pat. No. 9,332,497, the contents of both being incorporated herein by reference in their respective entireties.

FIELD

The present disclosure relates to power management of wireless clients in a wireless local area network. In particular, the present disclosure relates to automatic delivery traffic indication message (DTIM) interval control for better mobile power save performance.

BACKGROUND

Wireless digital networks, such as networks operating under the current Electrical and Electronics Engineers (IEEE) 802.11 standards, are spreading in their popularity and availability. In a wireless local area network (WLAN) deployment, a number of clients can be connected to the same wireless network via one or more access points. The number and type of smart phones, tablets, laptops and other clients that connect to WLANs continues to rise as new generations of clients hit the market. Such diverse clients with different operating systems and WLAN chipsets often result in a variety of connection speeds roaming behaviors, band preferences, and other capabilities.

Different wireless devices have very different power saving strategies and profiles. Such power saving strategies vary with factors, such as device make, device configuration, change in usage patterns, type of traffic being used (e.g. whether the traffic is broadcast, multicast, or unicast), etc. For example, in a tablet device where the user is actively browsing web data, the device will sleep less often. A delivery traffic indication message (DTIM) informs the clients about the presence of buffered multicast/broadcast data on the access point. It is generated within the periodic beacon at a frequency specified by the DTIM Interval. Every sleeping device on a wireless access point (AP) wakes up at least every DTIM interval to check if there are any pending broadcasts or multicast frames that the AP has buffered for it. This is the time the device has to wake up irrespective of whether the AP has buffered pending unicast frames for the station. In case of devices with less active usage, it is not very useful for the devices to wake up so often to check for pending multicast traffic. On the other hand, some client devices may wake up more frequently. Therefore, DTIM interval control is important for maintaining performance of wireless network for client devices, and at the meantime assuring that the client devices have good power save performance. The DTIM interval is typically configured in terms of number of beacons. For example, if the DTIM interval is configured as 3, then every third beacon will be considered as a DTIM beacon.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to power save management in wireless network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to virtual broadcast domains in a wireless local area network. In particular, the present disclosure relates to overlaying one or more virtual broadcast domains or groups on an underlying physical network in a wireless local area network.

With the solution provided herein, the disclosed network device receives a broadcast message from a member device (e.g. a client device that is a member) of a broadcast group. The broadcast group includes a subset of devices sharing at least one common property. The member device can receive a broadcast or multicast message from other member devices, but not from a non-member device of the first broadcast group. Furthermore, the broadcast group includes one of (i) a subset of devices from a single virtual local area network, and (ii) at least two subsets of devices from two or more virtual local area networks. The network device then determines the broadcast group associated with the received broadcast message based on the common property, and then transmits the received broadcast message to other member devices in the broadcast group.

Computing Environment

Figure 1:
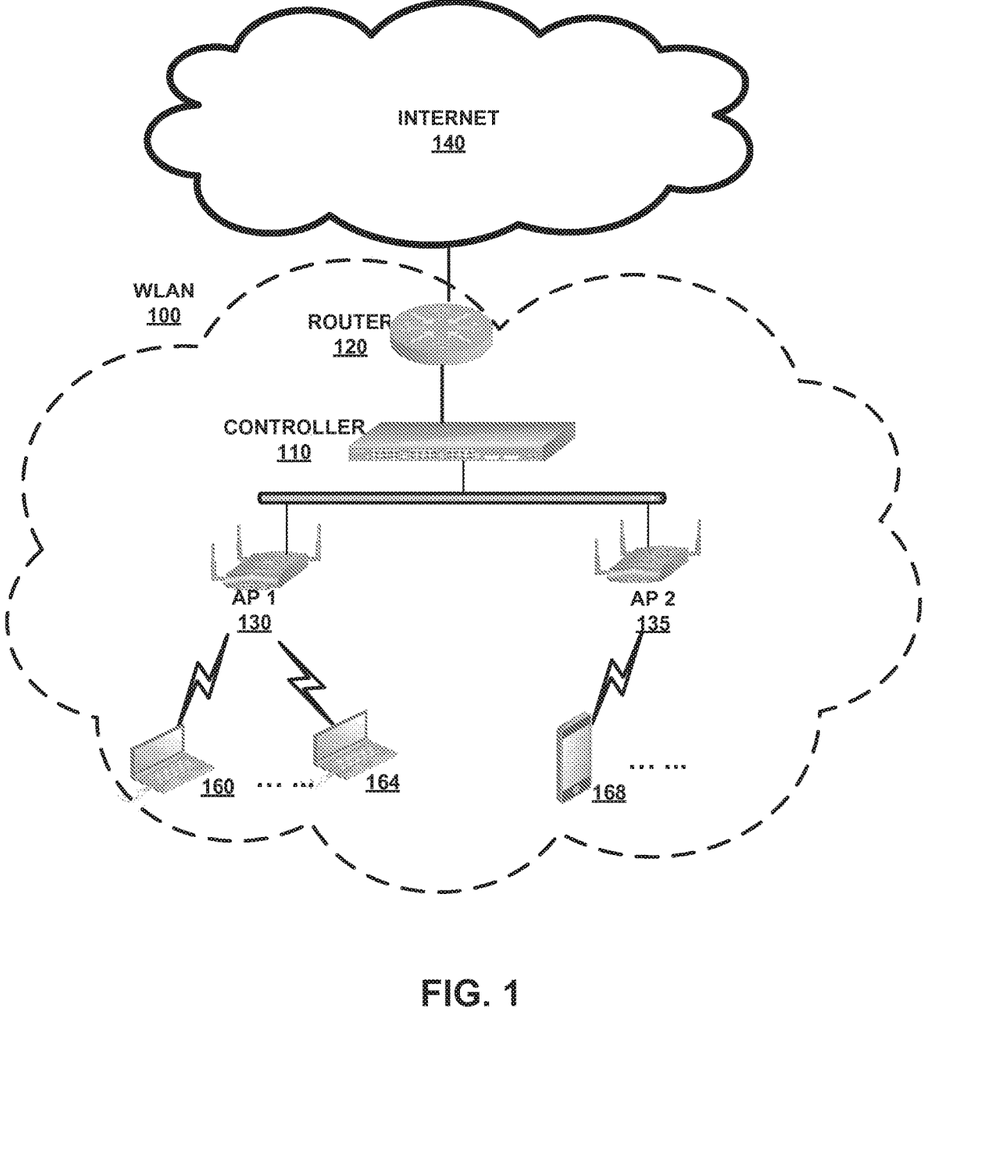
FIG. 1 is a diagram illustrating an exemplary wireless network environment according to embodiments of the present disclosure.

FIG. 1 shows an exemplary wireless digital network environment according to embodiments of the present disclosure. FIG. 1 includes a router 120 that connects a wireless local area network (WLAN), e.g., WLAN 100, and internet 140. WLAN 100 also includes at least a management network device, e.g., controller 110, which connects a plurality of network devices, such as access points API 130, AP2 135, etc., through wired or wireless connections. Each access point (AP) further provides wireless services to a number of client devices. As illustrated in FIG. 1. client devices 160-164 are associated with AP 1 130; and, client device 168 is associated with AP 2 135.

The network depicted in FIG. 1 may operate on a private network including one or more local area networks. The local area networks may be adapted to allow wireless access, thereby operating as a wireless local area network (WLAN). In some embodiments, one or more networks may share the same extended service set (ESS) although each network corresponds to a unique basic service set (BSS) identifier. In addition, network depicted in FIG. 1 may include multiple network control plane devices, such as network controllers, access points or routers capable of controlling functions, etc.

During operations, a wireless station, such as client devices 160, client device 164, or client device 168, is associated with a respective access point, e.g., access point AP 1 130, access point AP 2 135, etc. The APs may periodically transmit a beacon frame to announce the buffered broadcast and/or multicast packets to the client devices at a fixed interval period (e.g., DTIM interval period). Each client device wakes up at the fixed interval period to listen for the AP's beacon frame and receive the broadcast and/or multicast messages. In addition, each client may wake up one or more times during the interval period to receive unicast messages buffered at the AP for the specific client device.

Figure 2:
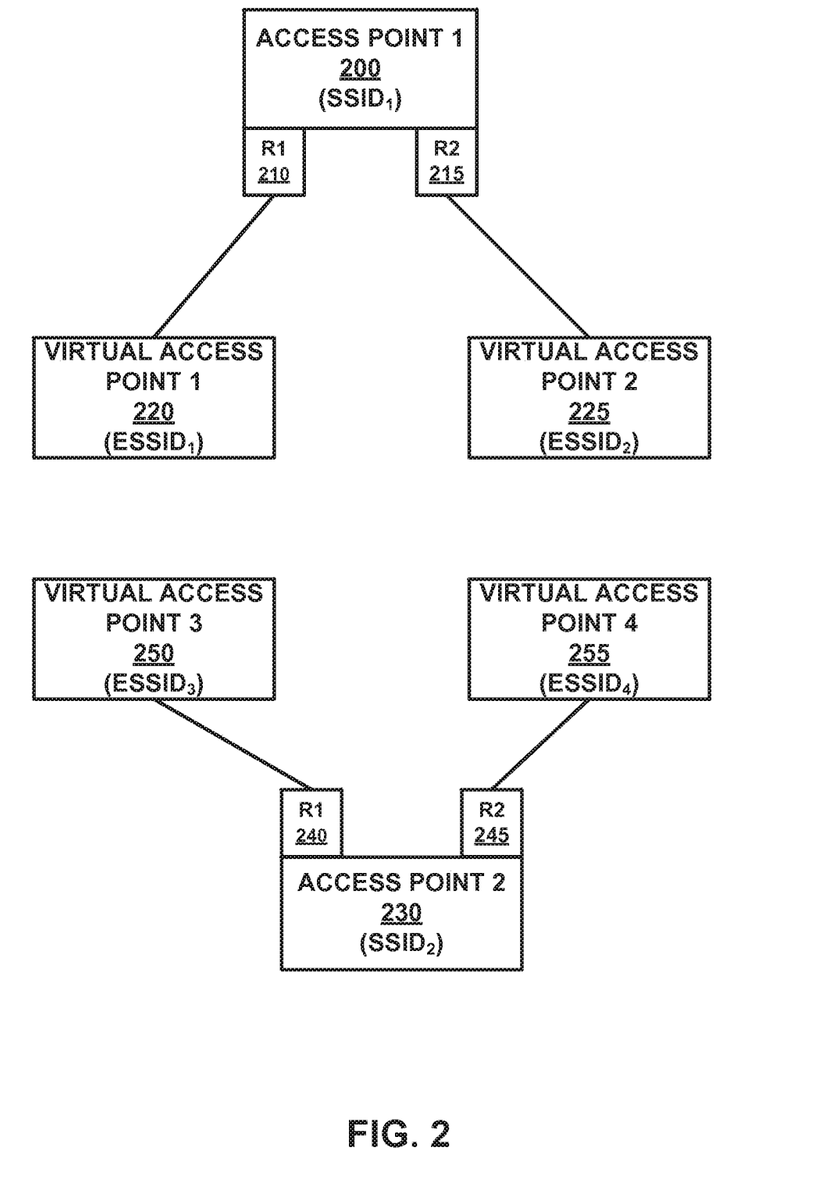
FIG. 2 is a diagram illustrating exemplary virtual access points according to embodiments of the present disclosure.

FIG. 2 is a diagram illustrating exemplary virtual access points according to embodiments of the present disclosure. A virtual access point (VAP) is a logical entity that resides within a physical access point (AP). To a client, the VAP appears as an independent access point with its own unique service set identifier (SSID). In the example illustrated in FIG. 2, Access Point 1 200 and Access Point 2 230 are two physical access points.

Each of them is configured with a unique SSID. For example, Access Point 1 200 is configured with $SSID_1$, and Access Point 1 200 is configured with $SSID_2$. Each AP can have multiple radios. For example, Access Point 1 200 has two radios R1 210 and R2 215. Access Point 2 230 has two radios R1 240 and R2 245. Each radio can be configured to advertise its own VAP with unique extended service set identifier (ESSID). For example, R1 210 of Access Point 1 200 is configured as Virtual Access Point 1 220 with $ESSID_1$; R2 215 of Access Point 1 200 is configured as Virtual Access Point 2 225 with $ESSID_2$; R1 240 of Access Point 2 230 is configured as Virtual Access Point 3 250 with $ESSID_3$; R2 245 of Access Point 2 230 is configured as Virtual Access Point 4 255 with $ESSID_4$; etc. According to embodiments of the present disclosure, each VAP can be configured with a different DTIM interval.

DTIM Interval Control

A delivery traffic indication message (DTIM) informs the clients about the presence of buffered multicast/broadcast data on the access point. It is generated within the periodic beacon at a frequency specified by the DTIM Interval. According to the IEEE 802.11 standards, a DTIM period value generally is a number that determines how often a beacon frame includes a Delivery Traffic Indication Message. This number is included in each beacon frame transmitted by an access point (AP) to indicate to the client devices whether the AP has buffered broadcast and/or multicast data waiting for them. Following a beacon frame that includes a DTIM, the AP will release the buffered broadcast and/or multicast data, if any exists. The higher the DTIM period, the longer a client device may sleep and therefore the more power that particular client device may potentially save.

Client devices in wireless networks may have conflicting requirements for power consumption and communication throughput when in power-save mode. For example, laptop computers may require relatively high communication throughput and may have low sensitivity to power consumption. Therefore, a relatively low DTIM period, for example 1, may be suitable for these devices. Pocket devices, however, may require relatively low communication throughput and may be operated by batteries of relatively low capacity. Therefore, a higher DTIM period, for example 8, may be suitable for pocket devices. But some of these have a medium to high communication throughput while still having small batteries, so would benefit from a medium DTIM period, such as 4.

Figure 3:
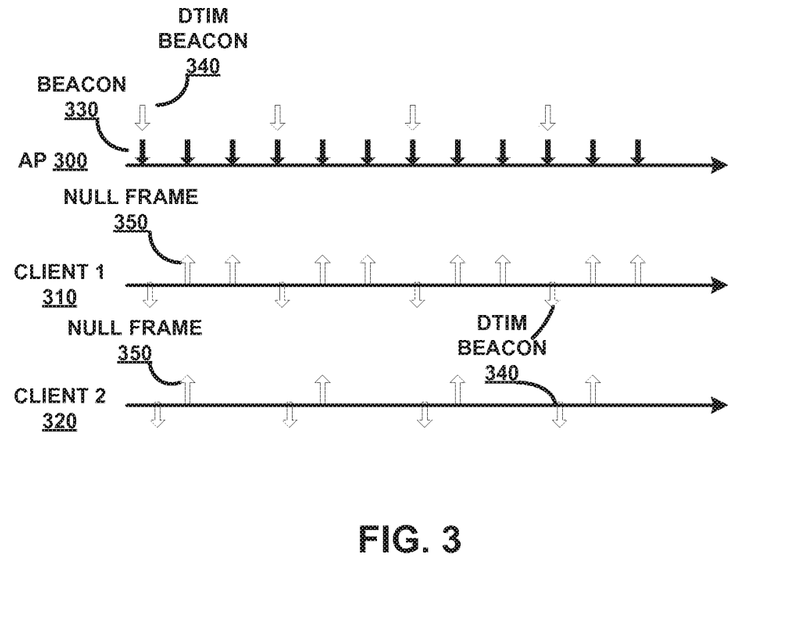
FIG. 3 illustrates exemplary communication frames transmitted by AP and/or client devices during power save mode according to embodiments of the present disclosure.

FIG. 3 illustrates exemplary communication frames transmitted by AP and/or client devices during power save mode according to embodiments of the present disclosure. AP 300 periodically transmits a beacon 330 at a fixed interval. In addition, AP 200 transmits a DTIM beacon 340 at a less frequent interval (e.g., every 3 beacon intervals). Client 1 310 and Client 2 320 wake up at the less frequent interval (e.g., every 3 beacon intervals) to listen for DTIM beacon 340. In addition, each client wakes up at different frequencies in between DTIM beacons 340 to check for buffered unicast messages for a specific client (e.g., client 1 310 or client 2 320).

Metric for Client Sleep Pattern

According to embodiments of the present disclosure, a client sleep pattern metric can be calculated for every client on a VAP. The client sleep pattern metric generally refers to a measure of the client's current sleep activity as seen from null data frames or any other frames sent by the client, which indicates a transition in power save state. This sleep activity duty cycle can be computed as the fraction of the number of times the client changes power management state in the DTIM_max time to the DTIM_Max interval. The DTIM_max time generally is the product of the beacon interval and the maximum setting for the DTIM interval.

For example, if the DTIM_Max interval is 5 beacon intervals, then the DTIM_max time is 500 milliseconds with a 100 millisecond beacon interval. Thus, if the client changes power management state 15 times during the 500-millisecond time period, then the client sleep pattern metric could be computed as 15/5=3. This client sleep pattern metric indicates that on an average the client wakes up about 3 times per beacon interval. Hence, such a client would function best with an AP or VAP that has a DTIM interval configured close to 1 beacon interval (the minimum configurable value). On the other hand, if the client wakes up only 3 times during the 500-millisecond time period, then the client sleep pattern metric could be computed as 3/5=0.6. Hence, the DTIM interval on the AP or VAP that would best suit such a client is 1/client-sleep-pattern-metric=1/0.6, which is approximately 2.

In some embodiments, all client power save states are maintained in a driver of a network device on a per-station basis. The network device would also compute and maintain a sleep duty cycle for each client. This client sleep pattern metric is a single metric that captures the aggressiveness of a client device's power management mechanism, and the traffic load from the client device. In other embodiments, the sleep pattern metric could be optionally computed and maintained on any entity in the network or in the cloud from where the DTIM interval of any AP could be configured.

Match APs DTIM Interval to Clients' Power Save Profile

There are three basic ways to match an AP's DTIM interval to a client device's power save profile: (1) steer client devices to best AP based on the AP's DTIM interval using Aruba ClientMatch™ technology; (2) dynamically recalibrate DTIM for each AP and/or VAP; and/or (3) a hybrid approach that combines both (1) and (2).

A. Steer Client Devices to Match AP's DTIM Interval

The first approach steers client devices to match the APs' DTIM intervals. Based on the client sleep pattern metric, a target DTIM setting can be calculated as 1/client-sleep-pattern-metric. This 1/client-sleep-pattern-metric can be exponentially averaged over a period of time for every client. Using this information, clients can be steered to the appropriate APs, radios, and/or VAPs. For example, if a client's sleep pattern metric is 3, the client will be steered to be associated with an AP or a VAP that has a DTIM interval configured close to 1 beacon interval. As another example, if the client sleep pattern metric is 0.6, the client will be steered to be associated with an AP or a VAP that has a DTIM interval configured close to 2 beacon intervals.

B. Dynamic Recalibration of AP's DTIM Interval

The second approach dynamically recalibrates an AP or VAP's DTIM interval based on sleep pattern metrics of the client devices associated with the AP or VAP. For example, the AP or VAP's DTIM interval can be configured as a number between 1 (or the minimum DTIM value) and (the maximum DTIM value). The minimum and maximum DTIM values are the ones that will not cause significant performance deterioration and will be configurable. The system will then compute an average interval value Time-Avg based on (1/client-sleep-pattern-metric) for every client. These interval values can be weighted across clients based on the type of device (e.g., whether the client device is recognized as a mobile device or power critical device) to generate a weighted average DTIM interval value. Using this information, the DTIM interval on the VAP profile can be recalibrated every so often to match the power profile of the clients. The dynamic recalibration of DTIM interval allows the system to determine how frequently clients associated with an AP or VAP prefers to wake up, and adjust the AP or VAP's DTIM interval configuration so that the clients are not forced to wake up to listen to multicast or broadcast frames more frequently than they would like.

Moreover, the DTIM interval can also be dynamically adjusted based on how much traffic clients associated with an AP or VAP have. For example, when a few clients associated with a particular AP or VAP are performing network intensive operations that generate a large amount of traffic, the system may adjust the DTIM interval for the particular AP or VAP to a short value. Subsequently, when those clients complete the operations and other clients prefer to wake up less frequently based on their client sleep pattern metrics, the system can dynamically adjust to reduce the DTIM interval of the particular AP or VAP.

In addition, the DTIM interval can be dynamically adjusted based on the presence and/or absence of a particular client device and/or user roles, etc. For example, if a VIP client device is associated with an AP, the AP's DTIM interval may be adjusted to match the VIP client device's preference.

Furthermore, the characteristics for the at least one client device indicate a current level of power remaining in a battery of the at least one client device. For example, when the current level of power remaining in the client battery is low, a long DTIM interval may be selected to help the client preserve its battery level.

Moreover, the DTIM interval can also be dynamically adjusted based on a current time. The current time generally refers to time of day, day of week, etc. For example, during night time when network usage is low, a relatively long DTIM interval may be selected. On the other hand, during work hours when network usage is high, a relatively short DTIM interval may be selected.

C. Hybrid Sleep Pattern Matching

In the hybrid approach, the system mixes both of the above approaches for achieving superior performance. Hence, depending on the network conditions, the system might optionally change the DTIM interval on the VAP/radio and/or it might also decide to move clients. In one embodiment with the hybrid approach, the system only moves client devices to other APs or VAPs when it is known with certainty that the client devices are not fairly active. In some embodiments, when the system just re-calibrated a VAP's DTIM; and there is a huge discrepancy in the target DTIM interval value for the client device from the re-calibrated DTIM interval value currently set on the VAP, the system will steer the client device away to another VAP with a DTIM that is closer to the client device's target DTIM interval value. Additional care could be taken with the DTIM interval adjustment to ensure that within a certain geographic location, there are at least a few numbers of APs or VAPs with different DTIM intervals configured. This will make sure that when the system moves the clients, there are multiple options for clients to move.

Figure 4A:
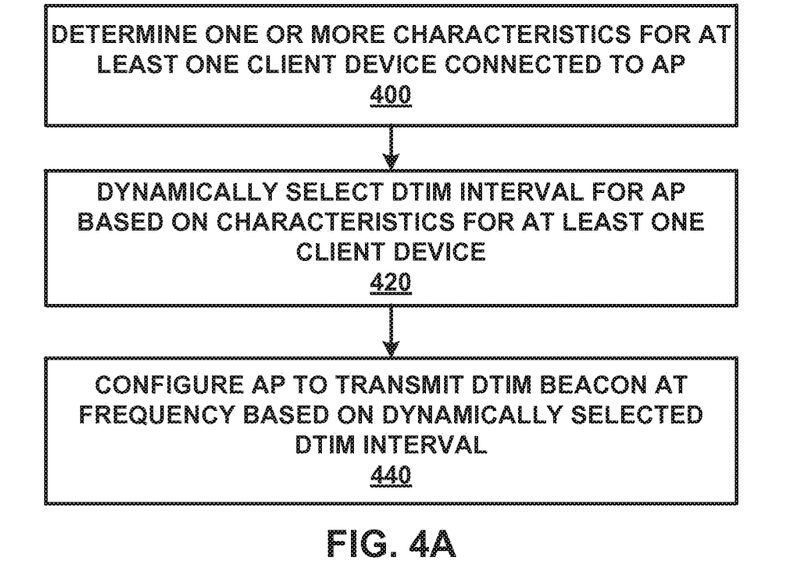
FIGS. 4A-4B illustrate exemplary processes for automatic DTIM interval control according to embodiments of the present disclosure.
Figure 4B:
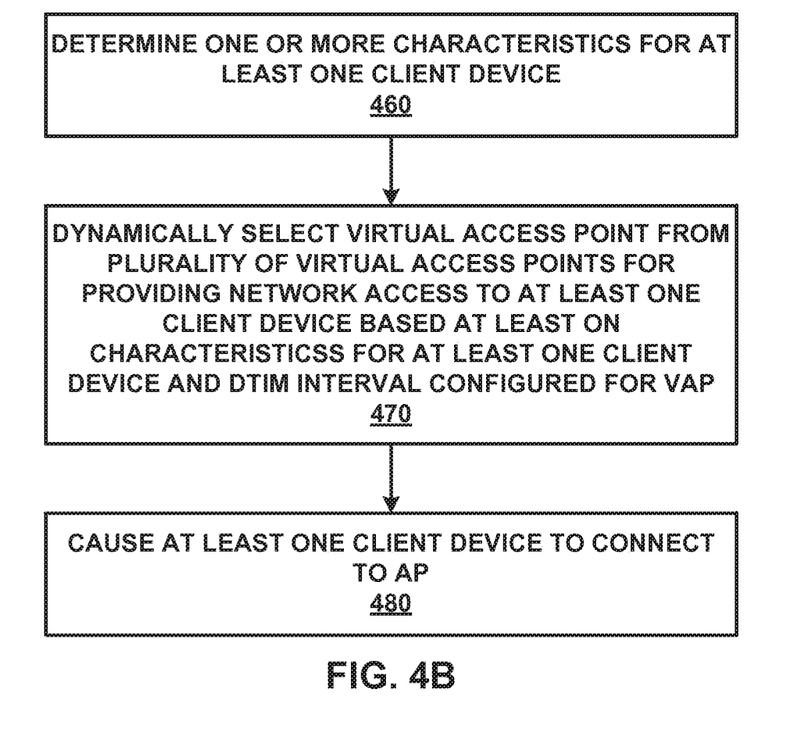

Processes for Automatic DTIM Interval Control for Better Mobile Power Save Performance FIGS. 4A-4B illustrate exemplary processes for automatic DTIM interval control according to embodiments of the present disclosure. Specifically, FIG. 4A illustrates an exemplary process wherein, during operations, the disclosed network device determines one or more characteristics for at least one client device connected to a first Access Point (AP) (operation 400). The network device then dynamically selects a Delivery Traffic Indication Message (DTIM) interval for the first AP based on the characteristics for the at least one client device (operation 420). The network device further configures the first AP to transmit a DTIM beacon frame at a frequency based on the dynamically selected DTIM interval (operation 440).

In some embodiments, the network device dynamically selects the DTIM interval for a first Virtual Access Point (VAP) of one or more VAPs executing on the first AP. In some embodiments, the network device dynamically selects the DTIM interval for a first radio of one or more radios of the first AP.

In some embodiments, the characteristics for the at least one client device indicate a frequency with which the at least one client device enters a power save mode, and/or a frequency with which the at least one client device exits a power save mode.

In some embodiments, the characteristics for the at least one client device are determined based on monitoring of the at least one client device during a period of time between transmissions of DTIM beacon frames. For example, the network device can monitor the number of NULL QoS frames that were sent by a client device during the period of time between transmissions of DTIM beacon frames. The NULL QoS frame contains no data but a set of flags, which include a power save bit indicating whether the client device enters or exits the power save mode.

In some embodiments, the characteristics for the at least one client device indicate an amount of data transmitted by the at least one client device over a period of time and/or an amount of data transmitted to the at least one client device over the period of time. For example, if a large amount of data is being transmitted to and-or by the at least one client device, the network device may configure its DTIM interval to a relatively short interval. On the other hand, if no data or very limited data is being transmitted to and-or by the at least one client device, the network device may configure its DTIM interval to a relatively long interval.

In some embodiments, the characteristics for the at least one client device indicate a type of data typically transmitted by the at least one client device. In some embodiments, the characteristics for the at least one client device indicate which applications are currently executing on the at least one client device. For example, if the client device is executing an application that frequently transmits or receives data, a short DTIM interval may be selected.

In some embodiments, the characteristics for the at least one client device indicate a current level of power remaining in a battery of the at least one client device. For example, when the current level of power remaining in the client battery is low, a long DTIM interval may be selected to help the client preserve its battery level.

In some embodiments, the DTIM interval is dynamically selected based further on a current time. The current time generally refers to time of day, day of week, etc. For example, during night time when network usage is low, a relatively long DTIM interval may be selected. On the other hand, during work hours when network usage is high, a relatively short DTIM interval may be selected.

Whereas multiple radios of an AP are configured as multiple Virtual Access Points (VAPs), the network device also dynamically selects DTIM interval values for the respective VAPs executing on the first AP based on characteristics associated with a plurality of client devices connected to at least one of the VAPs executing on the first AP.

Moreover, FIG. 4B illustrates an exemplary process for matching a client device to an AP or VAP. During operations, the disclosed network device determines one or more characteristics for at least one client device (operation 460). Moreover, the network device dynamically selects a first Virtual Access Point (VAP) from a plurality of VAPs, for providing network access to the at least one client device, based at least on the characteristics for the at least one client device and a Delivery Traffic Indication Message (DTIM) interval configured for the first VAP (operation 470). Also, the network device will cause the at least one client device to connect to the first VAP (operation 480). The network device may do so by using Aruba ClientMatch™ technology to intelligently steer the client to a desired AP, radio, and/or VAP on the WLAN.

Note that, the characteristics for the at least one client device indicate one or more of: frequency with which the at least one client device enters a power save mode: a frequency with which the at least one client device exits a power save mode; an amount of data transmitted by the at least one client device over a period of time: an amount of data transmitted to the at least one client device over the period of time: a type of data typically transmitted by the at least one client device; which applications are currently executing on the at least one client device; a current level of power remaining in a battery of the at least one client device; etc.

System for Automatic DTIM Interval Control

Figure 5:
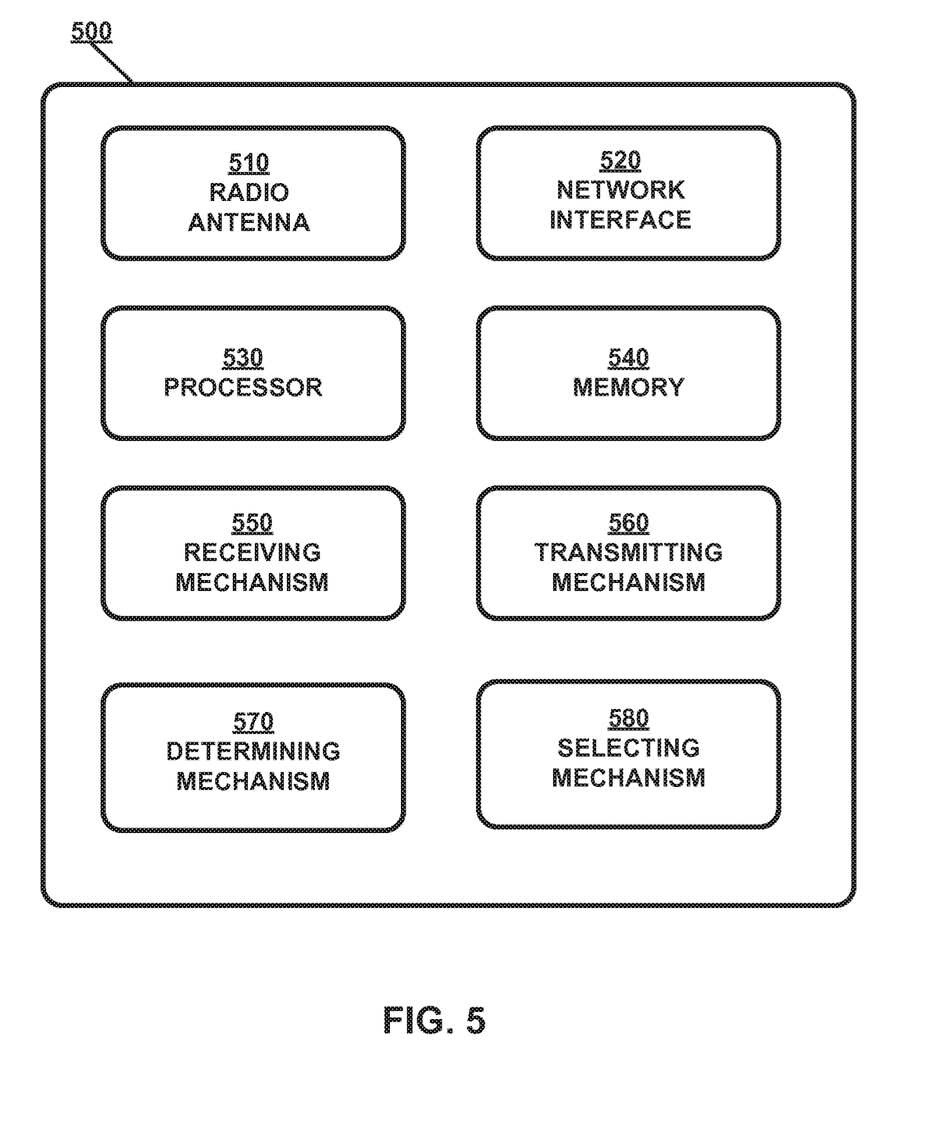
FIG. 5 illustrates a system for automatic DTIM interval control according to embodiments of the present disclosure.

FIG. 5 is a block diagram illustrating a system for automatic DTIM interval control according to embodiments of the present disclosure.

Network device 500 includes at least one or more radio antennas 510 capable of either transmitting or receiving radio signals or both, a network interface 520 capable of communicating to a wired or wireless network, a processor 530 capable of processing computing instructions, and a memory 540 capable of storing instructions and data. Moreover, network device 500 further includes a receiving mechanism 550, a transmitting mechanism 560, a determining mechanism 570, and a selecting mechanism 580, all of which are in communication with processor 530 and/or memory 540 in network device 500. Network device 500 may be used as a client system, or a server system, or may serve both as a client and a server in a distributed or a cloud computing environment.

Radio antenna 510 may be any combination of known or conventional electrical components for receipt of signaling, including but not limited to, transistors, capacitors, resistors, multiplexers, wiring, registers, diodes or any other electrical components known or later become known.

Network interface 520 can be any communication interface, which includes but is not limited to, a modem, token ring interface, Ethernet interface, wireless IEEE 802.11 interface, cellular wireless interface, satellite transmission interface, or any other interface for coupling network devices.

Processor 530 can include one or more microprocessors and/or network processors. Memory 540 can include storage components, such as Dynamic Random Access Memory (DRAM), Static Random Access Memory (SRAM), etc.

Receiving mechanism 550 generally receives one or more network messages via network interface 520 or radio antenna 510 from a wireless client. The received network messages may include, but are not limited to, requests and/or responses, beacon frames, management frames, control path frames, and so on. Each message may comprise one or more data packets, for example, in the form of IP packets.

Transmitting mechanism 560 generally transmits messages, which include, but are not limited to, requests and/or responses, beacon frames, management frames, control path frames, and so on. In some embodiments, transmitting mechanism 560 is configured to transmit a DTIM beacon frame at a frequency based on a dynamically selected DTIM interval by selecting mechanism 580.

Determining mechanism 570 generally determining one or more characteristics for at least one client device connected to an Access Point (AP) or Virtual Access Point (VAP). In some embodiments, determining mechanism 570 determines that a client shall be steered to another AP, radio, and/or VAP; and cause the client to be connected to the other AP, radio and/or VAP.

Selecting mechanism 580 generally dynamically selecting a Delivery Traffic Indication Message (DTIM) interval for the first AP based on the characteristics for the at least one client device.

In some embodiments, selecting mechanism 580 dynamically selects the DTIM interval for a first Virtual Access Point (VAP) of one or more VAPs executing on the first AP. In some embodiments, selecting mechanism 580 dynamically selects the DTIM interval for a first radio of one or more radios of the first AP. In some embodiments, selecting mechanism 580 dynamically selects DTIM interval values for respective Virtual Access Points (VAPs) executing on the first AP based on characteristics associated with a plurality of client devices connected to at least one of the VAPs executing on the first AP.

In some embodiments, selecting mechanism 580 dynamically selects a first Virtual Access Point (VAP) from a plurality of VAPs, for providing network access to the at least one client device, based at least on the characteristics for the at least one client device and a Delivery Traffic Indication Message (DTIM) interval configured for the first VAP.

In some embodiments, selecting mechanism 580 dynamically selects a first radio from a plurality of radios, for providing network access to the at least one client device, based at least on the characteristics for the at least one client device and a Delivery Traffic Indication Message (DTIM) interval configured for the first radio:

In some embodiments, the characteristics for the at least one client device indicate a frequency with which the at least one client device enters a power save mode and/or a frequency with which the at least one client device exits a power save mode.

In some embodiments, the characteristics for the at least one client device are determined based on monitoring of the at least one client device during a period of time between transmission of DTIM beacon frames.

In some embodiments, the characteristics for the at least one client device indicate an amount of data transmitted by the at least one client device over a period of time and/or an amount of data transmitted to the at least one client device over the period of time.

In some embodiments, the characteristics for the at least one client device indicate a type of data typically transmitted by the at least one client device.

In some embodiments, the characteristics for the at least one client device indicate which applications are currently executing on the at least one client device.

In some embodiments, the characteristics for the at least one client device indicate a current level of power remaining in a battery of the at least one client device.

In some embodiments, the DTIM interval is dynamically selected based further on a current time.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit: a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A network device, operable to:
   determine one or more characteristics for at least one client device connected to a first Access Point (AP);
   dynamically select in said first AP a Delivery Traffic Indication Message (DTIM) interval for the at least one client device based on the one or more characteristics; and
   transmit from said first AP a DTIM beacon frame at a frequency based on the dynamically selected DTIM interval selected by said first AP,
   wherein the one or more characteristics for the at least one client device indicate one or more of:
      a frequency with which the at least one client device enters a power save mode;
      a frequency with which the at least one client device exits the power save mode;
      an amount of data transmitted by the at least one client device over a period of time;
      an amount of data transmitted to the at least one client device over the period of time;
      a type of data typically transmitted by the at least one client device;
      the applications currently executing on the at least one client device; and
      a current level of power remaining in a battery of the at least one client device.

2. The network device of claim 1, wherein, to dynamically select the DTIM interval, said network device dynamically selects the DTIM interval for a first Virtual Access Point (VAP) of one or more VAPs executing on said first AP.

3. The network device of claim 1, wherein, to dynamically select the DTIM interval, said network device dynamically selects the DTIM interval for a first radio of one or more radios of said first AP.

4. The network device of claim 1, wherein said network device dynamically selects the DTIM interval based on the frequency with which the at least one client device enters the power save mode or the frequency with which the at least one client device exits the power save mode.

5. The network device of claim 1, wherein the characteristics for the at least one client device are determined based on monitoring, in said network device, the at least one client device during a period of time between transmission of DTIM beacon frames.

6. The network device of claim 1, wherein said network device dynamically selects the DTIM interval based on the amount of data transmitted by the at least one client device over a period of time or the amount of data transmitted to the at least one client device over the period of time.

7. The network device of claim 1, wherein said network device dynamically selects the DTIM interval based on the type of data typically transmitted by the at least one client device.

8. The network device of claim 1, wherein said network device dynamically selects the DTIM interval based on the applications that are currently executing on the at least one client device.

9. The network device of claim 1, wherein said network device dynamically selects the DTIM interval based on the current level of power remaining in a battery of the at least one client device.

10. The network device of claim 1, wherein the DTIM interval is dynamically selected by said network device based on a current time in addition to the one or more characteristics.

11. The network device of claim 1, further operable to dynamically select DTIM interval values for respective Virtual Access Points (VAPs) executing on the first AP based on characteristics associated with a plurality of client devices connected to at least one of the VAPs executing on said first AP.

12. A network device, operable to:
    determine one or more characteristics for at least one client device;
    dynamically select a first Virtual Access Point (VAP) from a plurality of VAPs, to provide network access to the at least one client device, based on the one or more characteristics for the at least one client device, wherein a DTIM interval for said at least one client device is determined by said network device based on a frequency that the at least one client device enters a power save mode; and
    cause the at least one client device to connect to said first VAP,
    wherein the one or more characteristics for the at least one client device indicate one or more of:
       the frequency with which the at least one client device enters the power save mode;
       a frequency with which the at least one client device exits the power save mode;
       an amount of data transmitted by the at least one client device over a period of time;
       an amount of data transmitted to the at least one client device over the period of time;
       a type of data typically transmitted by the at least one client device;
       the applications currently executing on the at least one client device; and
       a current level of power remaining in a battery of the at least one client device.

13. The network device of claim 12, wherein said network device dynamically selects said first VAP from the plurality of VAPs further based on a frequency with which the at least one client device exits the power save mode.

14. The network device of claim 12, wherein said network device is operable to dynamically select said first VAP from the plurality of VAPs further based on an amount of data transmitted by the at least one client device over a period of time or an amount of data transmitted to the at least one client device over the period of time.

15. A network device operable to:
    determine one or more characteristics for at least one client device;
    dynamically select, in said network device, a first radio from a plurality of radios, to provide network access to the at least one client device, based on the one or more characteristics for the at least one client device configured for the first radio, wherein a DTIM interval is determined by said network device based on applications that are currently executing on the at least one client device; and
    cause the at least one client device to connect to the first radio,
    wherein the one or more characteristics for the at least one client device indicate one or more of:
       a frequency with which the at least one client device enters a power save mode;

a frequency with which the at least one client device exits the power save mode;

an amount of data transmitted by the at least one client device over a period of time;

an amount of data transmitted to the at least one client device over the period of time;

a type of data typically transmitted by the at least one client device;

the applications that are currently executing on the at least one client device; and a current level of power remaining in a battery of the at least one client device.

16. The network device of claim 15, wherein said network device dynamically selects the first radio from the plurality of radios further based on a frequency with which the at least one client device enters a power save mode or a frequency with which the at least one client device exits the power save mode.

17. The network device of claim 15, wherein said network device dynamically selects the first radio from the plurality of radios further based on an amount of data transmitted by the at least one client device over a period of time or an amount of data transmitted to the at least one client device over the period of time.

18. The network device of claim 15, wherein said network device is operable to dynamically select the first radio from the plurality of radios further based on a current level of power remaining in a battery of the at least one client device.

* * * * *